United States Patent Office 2,900,305
Patented Aug. 18, 1959

2,900,305

PREPARATION OF IODINE POLYVINYL-PYRROLIDONE ADDUCTS

Sidney Siggia, Phillipsburg, N.J., assignor to General Aniline & Film Corporation, New York, N.Y., a corporation of Delaware No Drawing. Application August 9, 1956
Serial No. 603,185

13 Claims. (Cl. 167—70)

This invention relates to the preparation of an adduct of iodine and polymeric 1-vinyl-2-pyrrolidone (hereinafter referred to as polyvinylpyrrolidone) whereby there is formed a composition which is readily soluble in water to form a stable solution and which provides iodine in readily available in germicidally and bactericidally active form which is essentially non-toxic to warm-blooded animals.

In U.S. Patent 2,706,701 of Beller and Hosmer there is described a process for the preparation of a composition of iodine and polyvinylpyrrolidone. In accordance with the process of this patent, compositions of iodine and polyvinylpyrrolidone can be prepared by thoroughly mixing dry elemental iodine with dry powdered polyvinylpyrrolidone. The iodine and powered polymer may be mixed until a homogeneous powder is obtained, the mixing being carried out in materials which are not attacked by iodine so as to avoid the introduction of metal ions into the finished composition. This mixing may be effected by grinding the iodine and polyvinylpyrrolidone in a mortar and pestle or more advantageously in a suitable mechanical mixer such as a ball mill. The time of mixing varies only with the efficiency thereof, as the combination of the polyvinylpyrrolidone with iodine on its surface is rapid; in fact, such combination will occur to some extent on dropping iodine crystals on the dry powdered polymer.

On completion of the mixing there is obtained a compound in a physical state similar to the polymer alone but which contains varying proportions of iodine—available iodine (as distinguished from free iodine), iodide ion and bound iodine. A distinction between these forms may be made on an analytical basis, available iodine being determined directly by dissolving a sample of the product in water and titrating with 0.1-N sodium thiosulfate ($Na_2S_2O_3$) solution using starch as an indicator. The amount of iodine present as iodide ion is determined by reducing the iodine compound in solution with 1-N sodium acid sulfite ($NaHSO_3$), adding enough to make the solution colorless, then adding 0.1-N silver nitrate and enough nitric acid to make the solution acidic and back-titrating with ammonium thiocyanate ($NH_4SCN$). The iodide ion is the difference between this figure and the available iodine as determined above. The total iodine may be determined by combustion methods such as that formulated by Hallett in Scott's Standard Methods of Chemical Analysis, bound iodine then being determined by subtracting the sum of available iodine and iodide ion from the total iodine as determined above.

The product, i.e. the polyvinylpyrrolidone-iodine adduct, PVB–I, obtained in accordance with the process of the Beller and Hosmer patent suffers from the disadvantage that it is not stable in aqueous solution. The stability is reckoned with respect to loss of iodine in solution. (The iodine is reduced to iodide by an unknown factor in the polyvinylpyrrolidone.)

It is, accordingly, an important object of this invention to provide a process for the preparation of a polyvinylpyrrolidone-iodine adduct which is free from the aforementioned and other disadvantages. Another object of this invention is the provision of a polyvinylpyrrolidone-iodine adduct, prepared by the process of this invention, which is stable in aqueous solution. Other objects and advantages of this invention will appear from the following detailed description and claims.

I have found that when elemental iodine of either a technical or resublimed grade is added to solid polyvinylpyrrolidone, which has a moisture (water) content from 4 to 15%, as a blend, the blend mixed, with some grinding action if desired, in a glass or earthenware vessel as in the Bellar and Hosmer process, and the blend then heated to a temperature between 90 and 100° C., there is obtained a polyvinylpyrrolidone-iodine adduct of unique stability in aqueous solution.

I have also found that a polyvinylpyrrolidone-iodine adduct containing 20% available iodine when made with polyvinylpyrrolidone having a water content of 4 to 15% yields a more stable aqueous solution than a polyvinylpyrrolidone-iodine adduct containing 10% available iodine.

By "K value," as employed below, is meant Fikentscher K value (1000 k) as defined by H. Fikentscher in Cellulosechemie 13, 58–64, 71–4 (1932) and was determined with aqueous solutions of the polymer using an Ubbelohde viscosimeter at 25° C., the concentration being 1 gram of polymer (anhydrous basis) per 100 ml. of solution.

The details of the present invention will be apparent from the following specific examples in which the parts are by weight.

*Example I*

(a) To 191 grams of K–30 (Fikentscher K value) 1-vinyl-2-pyrrolidone polymer (10.7% water content) was added 30.9 grams of solid iodine in a glass bottle containing a few pebbles and beads. This was rolled for 6 hours on a roller mill. A heat treatment at 95° C. for 22 hours yielded a product containing 9.47% available iodine.

(b) For comparative purposes, a polyvinylpyrrolidone-iodine adduct containing 10% available iodine was prepared as described in U.S. Patent No. 2,706,701 except that dry polyvinylpyrrolidone was used in the preparation.

It was found that 20% aqueous solutions of polyvinylpyrrolidone-iodine (i.e., equivalent to 2% available iodine in solution) behaved as follows when stored at 65° C.

| | Iodine Content of Solution | |
|---|---|---|
| | Initial Iodine Concentration | After 19 days at 65° C. |
| | Percent | Percent |
| (a) PVP–I containing 10% $H_2O$ | 1.98 | 1.07 |
| (b) Control PVP–I by process of U.S. Patent No. 2,706,701 | 2.02 | 0.04 |

*Example II*

The blending procedure of Example I was performed using 161 grams of K–30 moist polyvinylpyrrolidone (12.4% water) and 60 grams of solid iodine. Heat treatment at 95° C. for 22 hours yielded a product containing 20.87% available iodine.

A sample of the polyvinylpyrrolidone-iodine complex, containing 20.87% of iodine was dissolved in water to yield a 2% iodine solution. After 19 days storage at 65° C., this material in aqueous solution had not lost any iodine at all.

Example III

It has been found, as indicated, that a minimum moisture content of 4% in the polyvinylpyrrolidone, blended with iodine is necessary in order to have aqueous solutions, and the resulting product to have acceptable stability on storage; and it is definitely preferable that the moisture content of the polyvinylpyrrolidone, blended with the iodine, have a minimum of about 6% moisture content. Maximum stability is obtained in aqueous solutions of the resulting product. Increasing the amount of moisture in the polyvinylpyrrolidone used for blending does not result in further increase in stability. However, it is not objectionable, since the same maximum stability is obtained. The maximum amount of moisture obtained should be about 15%, since, at higher moisture content, mechanical difficulties in processing arise. The effect of varying amounts of moisture in the polyvinylpyrrolidone are shown in the table below. The products listed in the table were prepared, as in Example Ia above, using polyvinylpyrrolidone having a K value of 30, and the moisture content indicated in the table.

| Percent $H_2O$ in Original PVP | Percent loss of available iodine in storage of 10% PVP-I solution at 42° C. for 10 days |
|---|---|
| 1.1 | 12 |
| 2.7 | 6 |
| 4.9 | 2 |
| 6.5 | 1 |
| 9.1 | 1 |
| 13.2 | 1 |

Example IV

It has been found that the same effect is obtained with PVP carrying higher K values. As indicated in the table below, in which PVP samples of K values of 60 and 90, respectively, and having moisture contents of 10.5 and 11.3%, respectively, were blended with about 20% by weight of elemental iodine in the manner described in Example Ia above.

| K value of PVP | Percent $H_2O$ in PVP | Freshly Prepared | | Stability Percent, Loss 1% Available Iodine-Aqueous Solution stored 10 days at 42° C. |
|---|---|---|---|---|
| | | Percent Available Iodine | Percent Iodide Ion | |
| 60 | 10.5 | 12.95 | 5.9 | 1 |
| 90 | 11.3 | 12.66 | 5.8 | 1 |

In practicing the present invention, it has been found that it is preferable to use a polyvinylpyrrolidone having a K value of at least 20, and more preferably about 30. From a preparative standpoint, it has been found that polyvinylpyrrolidone of low K value (and corresponding low molecular weight) consumes more iodine than does polyvinylpyrrolidone of higher K value—maximum for available iodine being reached when the K value of the polyvinylpyrrolidone is about 30. Also, the stability of the polyvinylpyrrolidone-iodine complex obtained when using polyvinylpyrrolidone of low K value is not as great as the stability of the polyvinylpyrrolidone-iodine adduct made from polyvinylpyrrolidone of higher K values. This is possible, due to the fact that the low K value of polyvinylpyrrolidone has more oxidizable fragments or end groups. Thus, the polyvinylpyrrolidone-iodine adduct, prepared from polyvinylpyrrolidone having a K value of 20, or lower, ceases to become commercially attractive, and the optimum product is obtained when the polyvinylpyrrolidone has a K value of about 30. Further increase in the K value of the polyvinylpyrrolidone is without substantial effect on the properties of the resulting adduct with iodine, until the K value becomes 90, at which time the solubility of the polyvinylpyrrolidone, in water, begins to decrease substantially.

The process of the instant invention makes for a ready method of combining iodine with polyvinylpyrrolidone to obtain a water solution of the polyvinylpyrrolidone-iodine adduct containing appreciable amounts of iodine, which does not deteriorate on standing as was the case of earlier aqueous solutions of polyvinylpyrrolidone-iodine adducts. The instant solution of the adduct is more stable than tincture of iodine and the complex in solution, does not give sting or epidermal burn, and on drying forms a protective coating on the skin. Moreover, the iodine in the solution of the adduct is less toxic than unreacted iodine.

It is to be understood that the foregoing detailed description is merely given by way of illustration and that many variations may be made therein without departing from the spirit of my invention.

Having described my invention, what I desire to secure by Letters Patent is:

1. Process for the preparation of a polyvinylpyrrolidone-iodine composition which is stable in aqueous solution, which comprises thoroughly mixing elemental iodine and powdered 1-vinyl-2-pyrrolidone polymer containing from 4.9–13.2% water, and heating the resulting composition at a temperature of from about 90 to 100° C. until a product containing an appreciable amount of available iodine is obtained.

2. Process for the preparation of a polyvinylpyrrolidone-iodine composition which is stable in aqueous solution, which comprises thoroughly mixing elemental iodine and powdered 1-vinyl-2-pyrrolidone polymer containing about 11% of water and heating the resulting composition at a temperature of 95° C. until a product containing about 9.5% available iodine is obtained.

3. Process for the preparation of a polyvinylpyrrolidone-iodine composition which is stable in aqueous solution, which comprises thoroughly mixing elemental iodine and powdered 1-vinyl-2-pyrrolidone polymer containing about 12.5% water and heating the resulting composition at a temperature of 95° C. until a product containing about 21% available iodine is obtained.

4. Process for the preparation of a stable aqueous solution of a polyvinylpyrrolidone-iodine composition, which comprises thoroughly mixing elemental iodine and powdered 1-vinyl-2-pyrrolidone polymer containing from 4.9 to 13.2% water, heating the resulting composition at a temperature of from about 90 to 100° C. until a product containing an appreciable amount of available iodine is obtained, and dissolving said product in water.

5. Process for the preparation of a stable aqueous solution of a polyvinylpyrrolidone-iodine composition, which comprises thoroughly mixing elemental iodine and powdered 1-vinyl-2-pyrrolidone polymer containing about 11% of water, heating the resulting composition at a temperature of 95° C. until a product containing about 9.5% available iodine is obtained, and dissolving said product in water.

6. Process for the preparation of a stable aqueous solution of a polyvinylpyrrolidone-iodine composition, which comprises thoroughly mixing elemental iodine and powdered 1-vinyl-2-pyrrolidone polymer containing about 12.5% water, heating the resulting composition at a temperature of 95° C. until a product containing about 21% available iodine is obtained, and dissolving said product in water.

7. Process for the preparation of a stable aqueous solution of a polyvinylpyrrolidone-iodine composition, which comprises thoroughly mixing elemental iodine and powdered 1-vinyl-2-pyrrolidone polymer having a K value, as defined, of 30 and containing about 11% of water, heating the resulting composition at a temperature of 95° C. until a product containing about 9.5% available iodine is obtained, and dissolving said product in water.

8. Process for the preparation of a stable aqueous solution of a polyvinylpyrrolidone-iodine composition, which comprises thoroughly mixing elemental iodine and powdered 1-vinyl-2-pyrrolidone polymer having a K value, as defined, of 30 and containing about 12.5% water, heating the resulting composition at a temperature of 95° C. until a product containing about 21% available iodine is obtained, and dissolving said product in water.

9. Process for the preparation of a stable aqueous solution of a polyvinylpyrrolidone-iodine composition, which comprises thoroughly mixing elemental iodine and powdered 1-vinyl-2-pyrrolidone polymer having a K value, as defined, of 60 and containing about 10.5% of water, heating the resulting composition at a temperature of 95° C. until a product containing about 12.95% available iodine is obtained, and dissolving said product in water.

10. Process for the preparation of a stable aqueous solution of a polyvinylpyrrolidone-iodine composition, which comprises thoroughly mixing elemental iodine and powdered 1-vinyl-2-pyrrolidone polymer having a K value, as defined, of 90 and containing about 10.5% of water, heating the resulting composition at a temperature of 95° C. until a product containing about 12.66% available iodine is obtained, and dissolving said product in water.

11. A stable aqueous solution of a polyvinyl-pyrrolidone-iodine composition, comprising the product of claim 1 dissolved in water, said solution being characterized by its ability to retain more of its available iodine content after storage than an aqueous solution of a polyvinyl-pyrrolidone-iodine composition produced from elemental iodine and polyvinylpyrrolidone containing less than 4% of water.

12. A stable aqueous solution of a polyvinylpyrrolidone-iodine composition, comprising the product of claim 2 dissolved in water, said solution being characterized by its ability to retain more of its available iodine content after storage than an aqeous solution of a polyvinylpyrrolidone-iodine composition produced from elemental iodine and polyvinylpyrrolidone containing less than 4% of water.

13. A stable aqueous solution of a polyvinylpyrrolidone-iodine composition, comprising the product of claim 3 dissolved in water, said solution being characterized by its ability to retain more of its available iodine content after storage than an aqueous solution of a polyvinylpyrrolidone-iodine composition produced from elemental iodine and polyvinylpyrrolidone containing less than 4% of water.

References Cited in the file of this patent

UNITED STATES PATENTS

| | | |
|---|---|---|
| 2,706,701 | Beller | Apr. 19, 1955 |
| 2,754,245 | Hosmer | July 10, 1956 |

UNITED STATES PATENT OFFICE

CERTIFICATE OF CORRECTION

Patent No. 2,900,305                                                            August 18, 1959

Sidney Siggia

It is hereby certified that error appears in the printed specification of the above numbered patent requiring correction and that the said Letters Patent should read as corrected below.

Column 1, line 65, for "PVB-I" read -- PVP-I --.

Signed and sealed this 19th day of April 1960.

(SEAL)
Attest:

KARL H. AXLINE                                          ROBERT C. WATSON
Attesting Officer                                 Commissioner of Patents